Oct. 14, 1930. F. G. WIKSTROM Re. 17,827

SHEET METAL FITTING AND METHOD OF ATTACHING THE SAME TO METAL WALLS

Original Filed March 31, 1927

INVENTOR
Frank G. Wikstrom
BY
Williams, Rich & Green
ATTORNEYS

Reissued Oct. 14, 1930 Re. 17,827

UNITED STATES PATENT OFFICE

FRANK G. WIKSTROM, OF BROOKLYN, NEW YORK, ASSIGNOR TO HADWIK MFG. CO. INC., OF BROOKLYN, NEW YORK, A CORPORATION OF NEW YORK

SHEET-METAL FITTING AND METHOD OF ATTACHING THE SAME TO METAL WALLS

Original application filed March 31, 1927, Serial No. 179,733. Divided and application filed September 28, 1927, Serial No. 222,409. Original No. 1,722,256, dated July 23, 1929. Application for reissue filed May 31, 1930. Serial No. 458,766.

This invention relates to sheet metal fittings adapted to be attached to metal walls, and is herein shown as embodied in a bung sput applied to a metallic barrel head, although it may, of course, be used in any container wall.

The general objects of the invention are to provide an improved sheet metal fitting and metallic structure and an improved method by which such fitting may be securely attached to a metal wall.

The Patent No. 1,722,256 issued July 23, 1929, for the reissue of which this application is filed, resulted from an application Ser. No. 222,409 filed Sept. 28, 1927, which was a division of an application Ser. No. 179,733 filed March 31, 1927.

Figure 1:
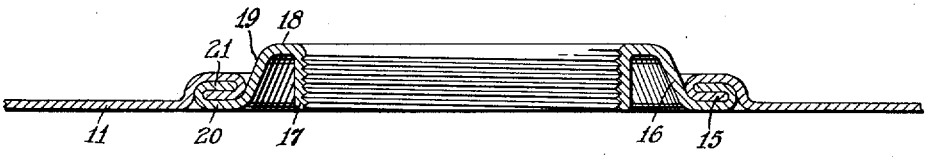
Figure 2:
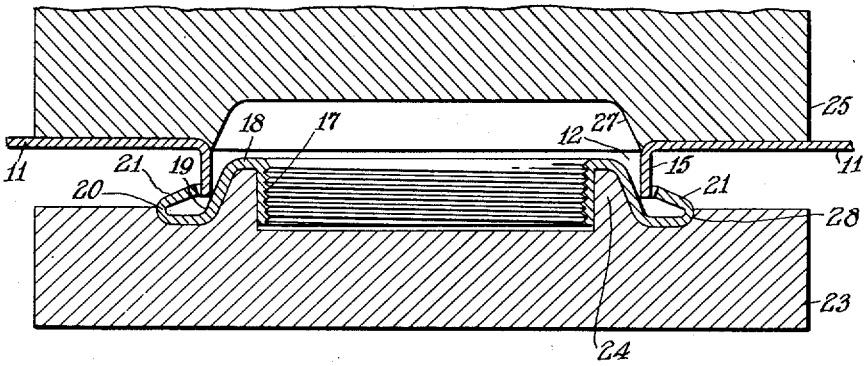
Figure 3:
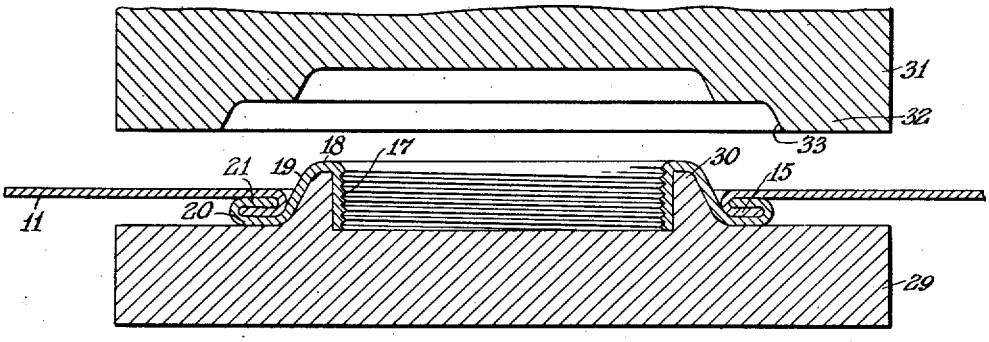

The invention will be understood from the following description taken in connection with the accompanying drawing in which Figure 1 is a sectional view through a bung sput construction embodying my invention; Figure 2 is a central sectional view showing a pair of die members adapted to be used in initially securing the bung sput to the barrel head and showing also the bung sput and barrel head in position to be operated upon by said die members; Figure 3 is a central sectional view showing another pair of die members adapted to be used in carrying out the final operation in securing the bung sput to the barrel head and also showing the bung sput and barrel head in position to be operated upon by said die members.

Referring to the drawing, the numeral 11 indicates a barrel head provided with an opening 12 surrounded by a depending anchor flange 15 with which the bung sput 16 cooperates, so as to prevent relative movement therebetween or leakage, in the manner hereinafter described. The bung sput is so designed as to enable it to be stamped and otherwise formed in suitable dies and is also designed so as to enable it to be securely attached to the barrel head 11, before the latter is embodied in the barrel, by means of dies shown in Figures 2 and 3 and hereinafter described.

As shown in the drawing, the bung sput 16 includes a bung-receiving portion in the form of an internally screw-threaded tubular member 17 formed integral with a relatively flat gasket seat 18 carrying a downwardly and outwardly projecting skirt 19 which terminates in a horizontally disposed base portion 20, the outer margin of which is turned back upon itself, thus forming an upwardly and inwardly projecting lock flange 21, having a width substantially equal to the width of the base portion and having its end, as shown in Figure 2, spaced a sufficient distance from the outer inclined face of the skirt 19 to permit the anchor flange 15 of the barrel head to enter the space afforded between the skirt 19 and the lock flange 21 preparatory to securing the bung sput 16 to the barrel head 11.

In attaching the bung sput 16 to the barrel head 11, the bung sput is placed upon a suitable die member 23, having an upwardly projecting annular supporting rib 24, so shaped as to conform to the space afforded between the tubular member 17 and the skirt 19 and to support the bung sput in the position shown in Figure 2. With the bung sput 16 thus supported, the barrel head 11, to which the bung sput is adapted to be connected, and which has not yet been attached to the barrel, is so positioned beneath a suitable die member 25 that the anchor flange 15 carried by the barrel head 11 is located in alignment with the opening or space afforded between the skirt 19 and the upper end of the lock flange 21. Before placing the barrel head 11 in the position shown in Figure 2, the outer surface of the anchor flange 15, may, if desired, be coated with a suitable sealing compound, not shown, in order to further insure an air and liquid-tight seal between the bung sput 16 and the barrel head 11 after these parts have been attached to one another. After positioning the barrel head 11 beneath the die member 25, as shown in Figure 2, the die member 25 is moved downwardly thereby forcing the lower end of the anchor flange 15 into sliding contact with the outer inclined face of the skirt 19, which in turn deflects the anchor flange 15 outwardly, as the die member 25 continues to move downwardly, so that the lower end of the anchor flange 15 is ultimately forced into intimate abutting engagement with the bung sput 16 at the fold of the base portion 20 and lock flange 21 of the bung sput. In order to insure such intimate contact, the anchor flange 15 is so dimensioned that it projects downwardly, as shown in Figure 2, for a distance somewhat greater than the width of the inner wall of the lock flange 21 plus the thickness of the metal of the lock flange at its free end. Inasmuch as the lower end of the anchor flange 15 moves into engagement with the bung sput 16 at the fold joining the lock flange 21 and the base portion 20, before the die member 25 completes its downward movement, the metal which surrounds the opening 12 in the barrel head 11 and is backed up by a depending abutment 27 of the die member 25, is forced outwardly along the outer curved face of the abutment 27 and over the adjacent face of the die member 25, as the die member 25 completes its downward movement, thereby causing the barrel head 11 to buckle or become distorted, as shown in Figure 3, such buckling or distortion being permitted by reason of clearance between the adjacent surfaces of the die members 23 and 25 in their final position. Immediately after the lower end of the anchor flange 15 engages the bung sput 16 at the fold of the base portion 20 and lock flange 21, contact between the upper end of the lock flange 21 and the barrel head 11 is established, and as the die member 25 continues its downward movement the lock flange 21, backed up by an abutment 28 formed integral with the die member 23, is moved along the lower face of the barrel head and into close engagement with the fold between the anchor flange 15 and the container wall, such fold being backed up by the depending abutment 27 of the die member 25. As the die member 25 completes its downward movement, the lock flange 21, backed up by the abutment 28 of the lower die member 23, is moved downwardly into horizontal position, and the flange 15 is caused to assume a similar position, whereupon a setting blow is delivered by the die member 25 to the barrel head 11 directly over the flanges 15 and 21, thereby forcing the base portion 20, anchor flange 15, lock flange 21, and container wall into firm face-to-face contact.

After having thus far assembled the bung sput 16 with respect to the barrel head 11, the head with its attached bung sput is placed upon a die member 29 having an upwardly projecting supporting rib 30 and otherwise the same as the die member 23 above explained, except for the omission of the abutment 28 shown in Figure 2. It is upon the die member 29 that the final operation is carried out in securing the bung sput 16 to the barrel head 11, as shown in Figure 1, and in carrying out this final operation a die member 31, shown in Figure 3, is employed. This die member 31 is provided with an annular depending portion 32, which as the die member 31 moves downwardly, engages the buckled or distorted portion or area of the barrel head 11 and moves or forms such head over and down into intimate engagement with the bung sput 16 at the fold between the lock flange 21 and the base portion 20, as shown in Figure 1. It is at this point in the assembling that the buckling or distortion of the barrel head 11, as explained in connection with Figure 2. is utilized to a further advantage, such further advantage residing in the fact that the necessity for any substantial drawing or stretching of metal in the barrel head 11 is obviated, since the required amount of metal necessary to the final operation is supplied from the buckled or distorted area with the result that such area again assumes its normally flat condition. The die member 31 is cut away or relieved as shown at 33 in order to accommodate the combined thickness of the barrel head 11, base portion 20, lock flange 21 and anchor flange 15, and to at the same time impart a setting blow to the barrel head 11 directly above the horizontally disposed anchor flange 15 and lock flange 21 at or about the time the die member 31 completes its downward movement, thus establishing an air and liquid tight connection between the barrel head 11 and the bung sput 16.

While many forms of caps or closures may be used with the bung sput construction hereinbefore described, said construction is particularly adapted for use in connection with the forms of caps described and claimed in my copending parent application hereinbefore mentioned.

What I claim is:

1. A sheet metal bung sput adapted to be attached to the container wall, characterized prior to its attachment by a tubular bung-receiving portion, a gasket seat projecting outwardly from the upper end of said tubular portion, a skirt projecting outwardly and downwardly from said gasket seat, a base portion projecting outwardly from the bottom of said skirt, and a lock flange inclined upwardly and inwardly from said base portion at a substantial angle from the vertical and towards said skirt and terminating a short distance from said skirt.

2. A sheet metal bung sput adapted to be attached to a container wall, characterized prior to its attachment by a tubular bung-receiving portion, a gasket seat projecting outwardly from the upper end of said tubular portion, a skirt projecting outwardly and downwardly from said gasket seat, a base portion projecting outwardly from the bottom of said skirt, and a lock flange inclined upwardly and inwardly from said base portion at a substantial angle to the vertical and towards said skirt and terminating a short distance from said skirt, said lock flange having a length substantially equal to the length of said base portion.

3. In a metallic receptacle, a wall having an opening therein surrounded by an anchor flange, and a sheet metal bung sput of the kind described in claim 1 having a tubular bung-receiving portion, a gasket seat projecting outwardly from the upper end of said tubular portion, a skirt projecting outwardly and downwardly from said gasket seat, a base portion projecting outwardly from the bottom of said skirt, a lock flange extending upwardly and inwardly from said base portion and into the space between said anchor flange and the container wall, the edge of said anchor flange being in close engagement with the inside of the fold between the lock flange and base portion of the sput, the edge of the lock flange being in close engagement with the inside of the fold between said anchor flange and the container wall, and the outside of the fold between said anchor flange and the container wall being in close engagement with the bottom portion of said skirt.

4. In a metallic receptacle, a wall having an opening therein surrounded by an anchor flange, and a sheet metal bung sput of the kind described in claim 1 having a tubular bung-receiving portion, a gasket seat projecting outwardly from the upper end of said tubular portion, a skirt projecting outwardly and downwardly from said gasket seat, a base portion projecting outwardly from the bottom of said skirt, a lock flange extending upwardly and inwardly from said base portion and into the space between said anchor flange and the container wall, the edge of said anchor flange being in close engagement with the inside of the fold between the lock flange and base portion of the sput, the edge of the lock flange being in close engagement with the inside of the fold between said anchor flange and the container wall, the outside of the fold between said anchor flange and the container wall being in close engagement with the bottom portion of said skirt, and the container wall being folded down into engagement with the outside of the fold between the base portion and the lock flange of the sput.

5. The method of attaching to a container wall, a sheet metal bung sput having a tubular bung receiving portion, a gasket seat projecting outwardly from the upper end of said tubular portion, a skirt projecting outwardly and downwardly from said gasket seat, a base portion projecting outwardly from the bottom of said skirt, and a lock flange inclined upwardly and inwardly from said base portion at a substantial angle from the vertical and toward said skirt and terminating a short distance from said skirt; which method consists in forming in the container wall an opening surrounded by an anchor flange having a width somewhat greater than the width of the inner wall of the lock flange of the sput plus the thickness of said lock flange; supporting said sput on a die which engages the under side of its gasket seat, skirt, base portion and fold between the base portion and lock flange; introducing the anchor flange of the container wall into the space between the lock flange and the skirt of the sput; and forcing the container wall downwardly and the anchor flange downwardly and outwardly along the surface of the skirt and base portion of the sput by a die engaging the top of the container wall and the fold between said wall and its anchor flange until the base portion and anchor flange and the lock flange and container wall are in face to face contact and until the edge of the anchor flange is in close engagement with the inside of the fold between the lock flange and the base portion of the sput and until the edge of the lock flange is in close engagement with the inside of the fold between the anchor flange and the container wall and until the outside of the fold between the anchor flange and container wall is in close engagement with the bottom portion of the skirt of the sput.

6. The method of attaching to a container wall a sheet metal bung sput having a tubular bung receiving portion, a gasket seat projecting outwardly from the upper end of said tubular portion, a skirt projecting outwardly and downwardly from said gasket seat, a base portion projecting outwardly from the bottom of said skirt, and a lock flange inclined upwardly and inwardly from said base portion at a substantial angle from the vertical and toward said skirt and terminating a short distance from said skirt, which method consists in forming in the container wall an opening surrounded by an anchor flange having a width somewhat greater than the width of the inner wall of the lock flange of the sput plus the thickness of said lock flange; supporting said sput on a die which engages the under side of its gasket seat, skirt, base portion and fold between the base portion and lock flange; introducing the anchor flange of the container wall into the space between the lock flange and the skirt of the sput; and forcing the container wall downwardly and the anchor flange downwardly and outwardly along the surface of the skirt and base portion of the sput by a die engaging the top of the container wall and the fold between said wall and its anchor flange until the base portion and anchor flange and the lock flange and container wall are in face to face contact and until the edge of the anchor flange is in close engagement with the inside of the fold between the lock flange and the base portion of the sput and until the edge of the lock flange is in close engagement with the inside of the fold between the anchor flange and the container wall and until the outside of the fold between the anchor flange and container wall is in close engagement with the bottom portion of the skirt of the sput and until the container wall is folded down into engagement with the outside of the fold between the base portion and the lock flange.

7. A sheet metal fitting adapted to be attached to a metal wall, characterized prior to its attachment by a skirt projecting outwardly and downwardly, a base portion projecting outwardly from the bottom of said skirt, and a lock flange inclined upwardly and inwardly from said base portion at a substantial angle from the vertical and towards said skirt and terminating a short distance from said skirt.

8. A sheet metal fitting adapted to be attached to a metal wall, characterized prior to its attachment by a skirt projecting outwardly and downwardly, a base portion projecting outwardly from the bottom of said skirt, and a lock flange inclined upwardly and inwardly from said base portion at a substantial angle to the vertical and towards said skirt and terminating a short distance from said skirt, said lock flange having a length substantially equal to the length of said base portion.

9. In a metallic structure, a metal wall having an opening therein surrounded by an anchor flange, and a sheet metal fitting of the kind described in claim 7 having a skirt projecting outwardly and downwardly, a base portion projecting outwardly from the bottom of said skirt, a lock flange extending upwardly and inwardly from said base portion and into the space between said anchor flange and said wall, the edge of said anchor flange being in close engagement with the inside of the fold between the lock flange and base portion of the fitting, the edge of the lock flange being in close engagement with the inside of the fold between said anchor flange and said wall, and the outside of the fold between said anchor flange and said wall being in close engagement with the bottom portion of said skirt.

10. In a metallic structure, a metal wall having an opening therein surrounded by an anchor flange, and a sheet metal fitting of the kind described in claim 7 having a skirt projecting outwardly and downwardly, a base portion projecting outwardly from the bottom of said skirt, a lock flange extending upwardly and inwardly from said base portion and into the space between said anchor flange and said wall, the edge of said anchor flange being in close engagement with the inside of the fold between the lock flange and base portion of the fitting, the edge of the lock flange being in close engagement with the inside of the fold between said anchor flange and said wall, the outside of the fold between said anchor flange and said wall being in close engagement with the bottom portion of said skirt, and said wall being folded down into engagement with the outside of the fold between the base portion and the lock flange of the fitting.

11. The method of attaching to a metal wall, a sheet metal fitting, having a skirt projecting outwardly and downwardly, a base portion projecting outwardly from the bottom of said skirt, and a lock flange inclined upwardly and inwardly from said base portion at a substantial angle from the vertical and toward said skirt and terminating a short distance from said skirt; which method consists in forming in said wall an opening surrounded by an anchor flange having a width somewhat greater than the width of the inner wall of the lock flange of the fitting plus the thickness of said lock flange; supporting said fitting on a die which engages the under side of its skirt, base portion and fold between the base portion and lock flange; introducing the anchor flange of said wall into the space between the lock flange and the skirt of the fitting; and forcing said wall downwardly and the anchor flange downwardly along the surface of the skirt and base portion of the fitting by a die engaging the top of said wall and the fold between said wall and its anchor flange until the base portion and anchor flange and the lock flange and said wall are in face to face contact and until the edge of the anchor flange is in close engagement with the inside of the fold between the lock flange and the base portion of the fitting and until the edge of the lock flange is in close engagement with the inside of the fold between the anchor flange and said wall and until the outside of the fold between the anchor flange and said wall is in close engagement with the bottom portion of the skirt of the fitting.

12. The method of attaching to a metal wall a sheet metal fitting having a skirt projecting outwardly and downwardly, a base portion projecting outwardly from the bottom of said skirt, and a lock flange inclined upwardly and inwardly from said base portion at a substantial angle from the vertical and toward said skirt and terminating a short distance from said skirt, which method consists in forming in said wall an opening surrounded by an anchor flange having a width somewhat greater than the width of the inner wall of the lock flange of the fitting plus the thickness of said lock flange; supporting said fitting on a die which engages the under side of its skirt, base portion and fold between the base portion and lock flange, introducing the anchor flange of said wall into the space between the lock flange and the skirt of the fitting; and forcing said wall downwardly and the anchor flange downwardly and outwardly along the surface of the skirt and base portion of the fitting by a die engaging the top of said wall and the fold between said wall and its anchor flange until the base portion and anchor flange and the lock flange and said wall are in face to face contact and until the edge of the anchor flange is in close engagement with the inside of the fold between the lock flange and the base portion of the fitting and until the edge of the lock flange is in close engagement with the inside of the fold between the anchor flange and said wall and until the outside of the fold between the anchor flange and said wall is in close engagement with the bottom portion of the skirt of the fitting and until said wall is folded down into engagement with the outside of the fold between the base portion and the lock flange.

In testimony whereof, I have affixed my signature to this specification.

FRANK G. WIKSTROM.